Sept. 1, 1964 F. M. E. DELAMAIRE 3,146,975
ROTARY POWDER MOTOR AND ITS APPLICATIONS
TO AERONAUTICS AND TO PARACHUTES
Filed Dec. 26, 1961 3 Sheets-Sheet 1
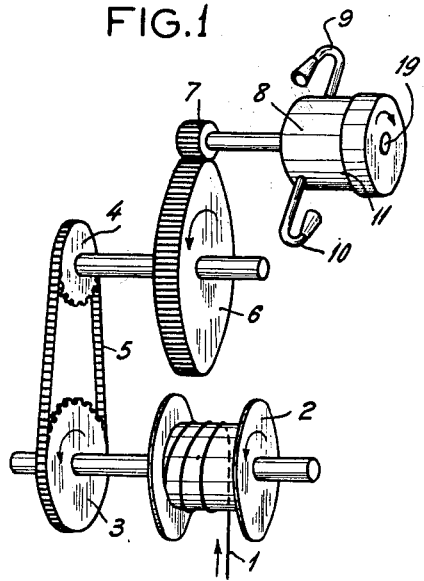
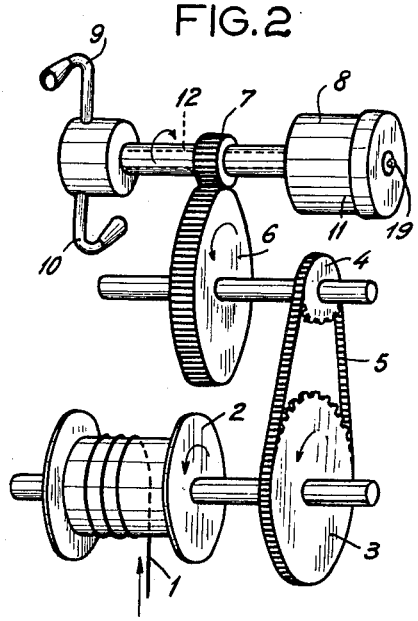
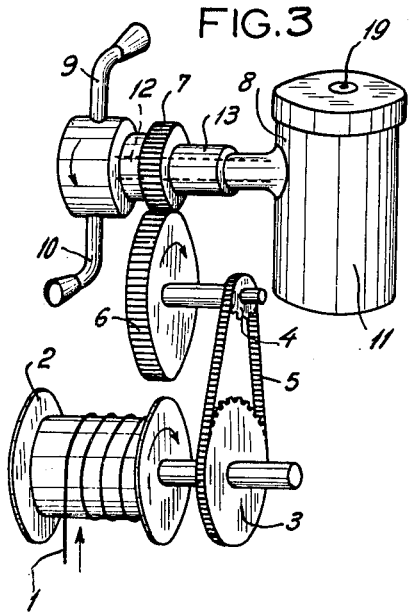
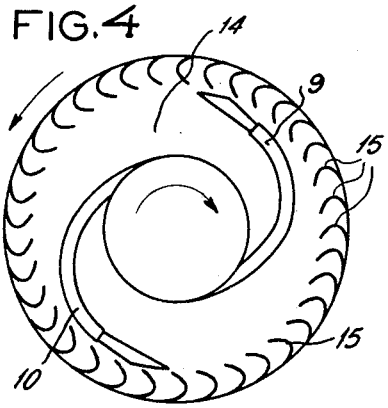
INVENTOR
FRANCOIS M.E. DELAMAIRE
BY
Woodhams, Blanchard & Flynn
ATTORNEYS Sept. 1, 1964  F. M. E. DELAMAIRE  3,146,975
ROTARY POWDER MOTOR AND ITS APPLICATIONS
TO AERONAUTICS AND TO PARACHUTES
Filed Dec. 26, 1961  3 Sheets-Sheet 2
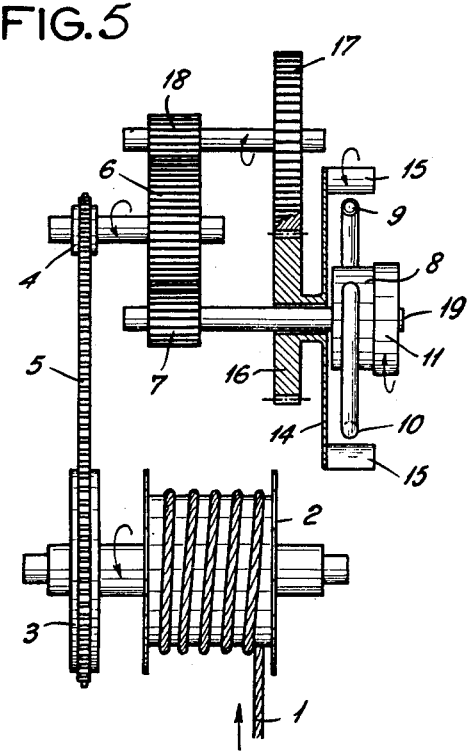
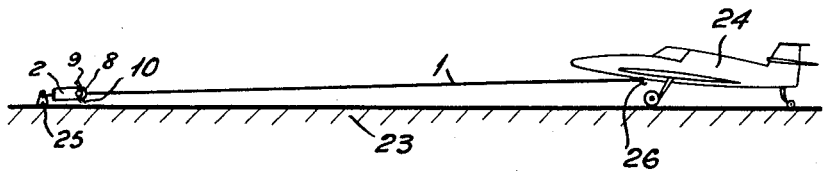
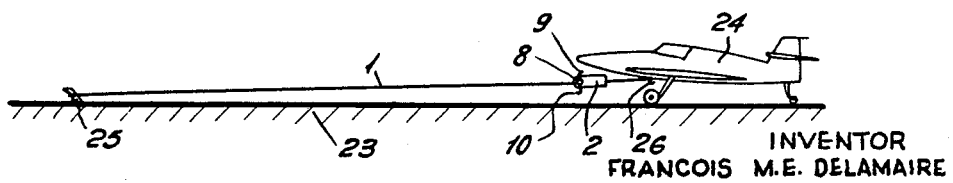
INVENTOR
FRANCOIS M.E. DELAMAIRE
BY
Woodhams Blanchard Flynn
ATTORNEYS Sept. 1, 1964  F. M. E. DELAMAIRE  3,146,975
ROTARY POWDER MOTOR AND ITS APPLICATIONS
TO AERONAUTICS AND TO PARACHUTES
Filed Dec. 26, 1961  3 Sheets-Sheet 3
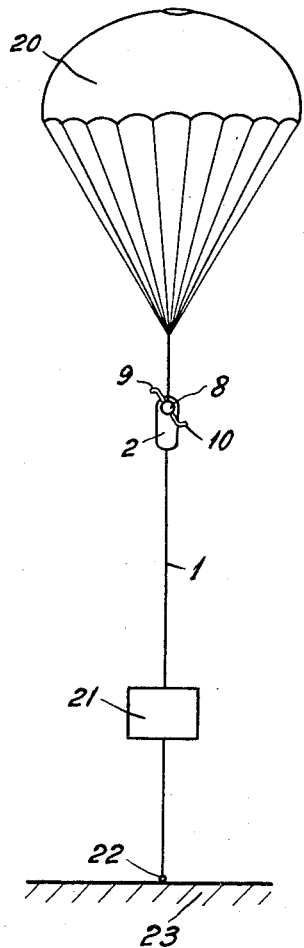
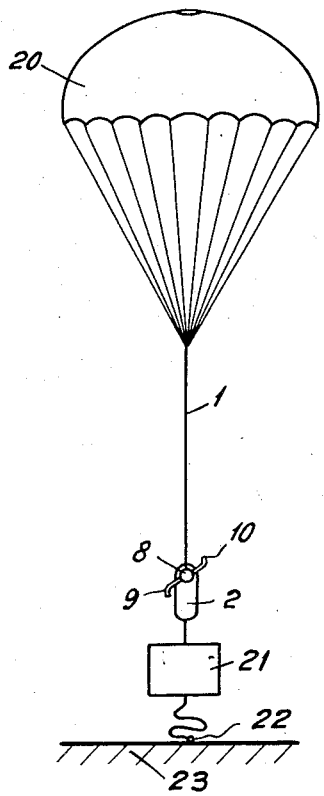
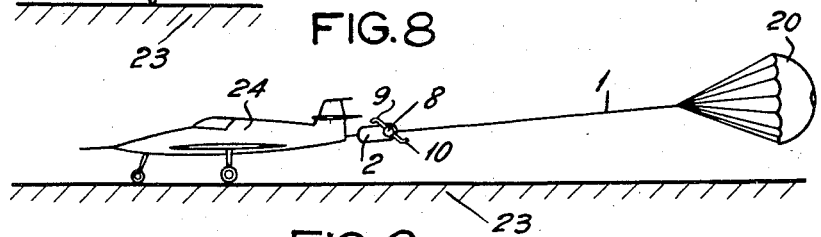
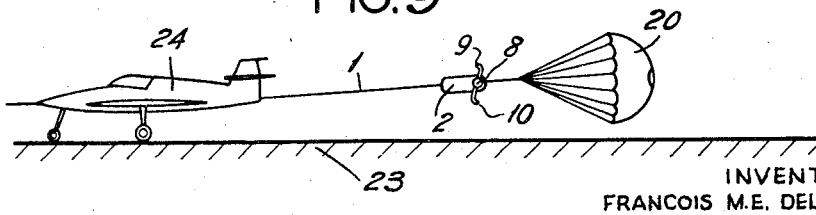
INVENTOR
FRANCOIS M.E. DELAMAIRE
BY
*Woodhams Blanchard & Flynn*
ATTORNEYS

United States Patent Office 3,146,975
Patented Sept. 1, 1964

3,146,975
ROTARY POWDER MOTOR AND ITS APPLICATIONS TO AERONAUTICS AND TO PARACHUTES
François Marie Emile Delamaire, 9 Rue Garibaldi, Lyon, Rhone, France
Filed Dec. 26, 1961, Ser. No. 162,131
Claims priority, application, France, Jan. 13, 1961, 849,593, Patent 1,285,406; Dec. 8, 1961, 881,431, Patent 1,315,208
6 Claims. (Cl. 244—113)

Military or civil industry has frequently a need for a motor capable of starting-up instantaneously and in a sure manner, developing immediately its full torque, and able, with a low weight and small overall size, to supply a considerable torque for a limited period.

The invention relates to a motor of this kind, and in particular to its applications to aeronautics and to parachutes.

The invention is applicable to parachuted loads, for which it has for its object to reduce in a large proportion, and even almost to annul, the speed of impact of this load on the ground; at that moment, the motor according to the invention impresses a substantial speed of approach on the load with respect to its parachute.

The invention has the advantage of making it possible to dispense with costly precautions necessary for the protection of the equipment dropped. The invention has the further advantage of permitting higher speeds of descent, which is desirable from the point of view of tactics in the military art, and also from the point of view of precision of dropping in all cases. Still a further advantage of the invention is to permit heavier loads and/or to enable smaller parachutes to be employed.

The invention is also applicable to the landing of aircraft, especially of high-speed aircraft, braked by a tail parachute; it has the object of reducing considerably the distance travelled by the aircraft after touching down. The motor according to the invention impresses on the parachute a considerable speed of approach with respect to the aircraft; in particular, the speed of the parachute with respect to the ground may be kept constant at a maximum value during the whole landing operation. The invention has the advantage of enabling landings to be made on runways or landing grounds having a length much less than the normal length. The invention has also the advantage of permitting the landing of heavier and/or faster aircraft than those for which the landing ground had been provided. Still a further advantage of the invention is to permit the use of smaller parachutes on heavier and/or faster aircraft.

The invention is also applicable to the taking-off of aircraft which it has the object of effecting in a manner similar to the conventional catapult used on aircraft carriers; the motor according to the invention impresses on the aircraft a considerable and semi-constant maximum acceleration. The invention has the advantage of making it possible to place the entire taking-off operation under the control of the pilot of the aircraft alone, without any ground staff being necessary. The invention has the still further advantage of requiring only very small installations on the ground, and these may even be limited to a simple hook, thus permitting aircraft to take-off from an emergency landing ground, in this case also without ground staff.

Powder motors have already been proposed, but up to the present time, none has reached the practical stage, because they have not exhibited the necessary characteristics, which are:
Sufficiently long travel and duration of operation;
Instantaneous and certain starting-up;
Maximum power immediately on starting-up;
Low weight and small overall size for a considerable torque;
Strength and safety in operation.

The motor according to the invention has been designed to comply with the above conditions. In its widest aspect, the invention provides that the reaction motor is constituted by one or a number of rotary discharge nozzles ejecting at very high speed the combustion gases of a charge of powder, and applying a tangential thrust to a member adapted to receive a movement of rotation which is transmitted, through a suitable step-down gear ratio, to the drum of a winch on which is wound a cable.

It is clear that, designating by R the ratio of the paths followed by one of the discharge nozzles and by the cable, it will only be necessary for the tangential thrust F of the discharge nozzles to be equal to $T/R$ in order to apply to the cable the tractive force T required—the value thus found for F being of course increased in order to take account for inertia and friction. As it is easy to give the ratio R a large value, for example of the order of 20, it is only necessary to provide a relatively low tangential thrust F for a given force T.

In its preferred form of application to parachuted loads, the invention provides that the remote extremity of the winch cable according to the invention is, depending on questions of choice or opportunity, attached either to the load or to the parachute, the motor and the winch being attached to the other of these two members. The motor according to the invention is started up at the appropriate distance from the ground by any suitable means, for example by a probe acting on a fuse. The winch then brings the load and the parachute closer together, thus reducing the speed of impact of the load on the ground, this reduction attaining substantial proportions.

The invention, in its preferred form of application to the landing of aircraft, provides that the free extremity of the winch cable according to the invention is attached, depending on questions of choice or opportunity, either to the aircraft or to the parachute, the motor and the winch being attached to the other of these two devices. The motor according to the invention is started up immediately after the opening of the parachute by any appropriate means, for example by the pilot acting on a firing device. The winch thus brings the aircraft and the parachute closer together, and in particular the winch according to the invention, working with a constant tractive pull on the cable maintains constant and at a maximum value, the speed of the parachute with respect to the ground, and therefore also the deceleration of the aircraft.

In its preferred form of application to the taking-off of aircraft, the invention provides that the free extremity of the winch cable according to the invention is attached, depending on questions of choice or opportunity, either to the aircraft or to a fixed point on the ground, by means of course of the conventional releasable hook. The motor according to the invention is started up at the selected moment, for example by the pilot acting on a firing device. The winch then urges the aircraft towards the fixed point, and in particular the winch according to the invention, working with a constant tractive pull on the cable, maintains at a constant and maximum value the acceleration impressed on the aircraft; the aircraft leaving the ground drops the hook in known manner.

With the objects above stated, the invention resides in the combination and the arrangement of the devices which are described and claimed below, it being understood that modifications may be made to the applications described in the following text, while remaining within the scope of the invention.

Other objects and advantages of the invention will become apparent from the description which follows, made with reference to the accompanying drawings, given by way of non-limitative examples, and in which:

FIG. 1 represents diagrammatically the motor according to the invention.

FIG. 2 shows a further arrangement of the motor according to the invention.

FIG. 3 represents still a further arrangement of the motor according to the invention.

FIG. 4 is an explanatory detail of a further arrangement, shown in FIG. 5, of the motor according to the invention.

FIG. 6 shows the application of the motor according to the invention to a parachuted load, the motor being attached to the parachute.

FIG. 7 shows the application of the motor according to the invention to a parachuted load, the motor being attached to the load.

FIG. 8 represents the application of the motor according to the invention to the landing of an aircraft, the motor being attached to the aircraft.

FIG. 9 represents the application of the motor according to the invention to the landing of an aircraft, the motor being attached to the parachute.

FIG. 10 represents the application of the motor according to the invention to the taking-off of an aircraft, the motor being attached to the aircraft.

FIG. 11 shows the application of the motor to the taking-off of an aircraft, the motor being attached to a stationary point.

In its widest aspect, the invention provides a motor having the construction shown diagrammatically in FIG. 1. The cable 1, on which is to be applied the tractive force T, is wound on a winch 2; this winch 2 is driven for example by a double reduction gear comprising two wheels 3 and 4 with a chain 5, and two gears 6 and 7, from the motor 8, which is provided for example with two discharge nozzles 9 and 10. The motor 8 is provided with a combustion chamber 11; this combustion chamber 11 is fitted with the nozzles 9 and 10, and rotates with the said nozzles.

FIG. 2 shows another arrangement of the motor, in which the chamber 11 is separated from the discharge nozzles 9 and 10, and is coupled thereto by a hollow shaft 12 carrying the gear 7; the gases generated in the chamber 11 pass into the interior of the hollow shaft 12 to reach the nozzles 9 and 10.

FIG. 3 shows still another arrangement of the motor, according to which the chamber 11 is fixed and communicates with the nozzles 9 and 10 by a joint 13 and the hollow shaft 12 carrying the gear 7.

Finally, in order to obtain a better thermo-dynamic efficiency, even at the cost of reduced simplicity of the construction, the nozzles 9 and 10 rotate inside or alongside a wheel 14 provided with blades 15 see (FIG. 4). These blades 15 receive the gases discharged from the nozzles and thus recover part of the kinetic energy of the gases. The wheel 14 is mounted for example, as shown in FIG. 5, on a hollow shaft carrying a pinion 16; this pinion 16 engages with a pinion 17 mounted on the same shaft as a pinion 18 engaged with the gear 6, the whole unit having the necessary reversal of rotation, since the wheel 14 rotates in the opposite direction to the exhaust nozzles 9 and 10.

In the various arrangements of the motor 8, in accordance with FIGS. 1 to 5, the supply for the discharge-nozzles is readily obtained by the combustion of a charge of powder placed in the chamber 11, in which it is fired by an electric primer 19, the circuit of which is closed at the required moment.

The constitution of the charge of powder is chosen in dependence on the law following which the tractive force T is desired to be varied, that is to say the tangential thrust F of the discharge-nozzles which is proportional thereto, by employing the following principles:

(a) The powder burns in parallel layers with a speed which is a function of the pressure;

(b) The thrust developed at the discharge-nozzle is proportional to the section of the neck and to the pressure;

(c) For a given powder and a given pressure, there is a constant ratio (coefficient of compression) between the section of the neck (for all the discharge-nozzles) and the surface in ignition of the blocks forming the charge.

It can therefore be seen that if the charge is formed in the simplest manner, by discs protected by an inhibitor varnish on their lateral surfaces, these discs will only burn at their transverse faces or transverse sections, the surface in ignition will be constant and the duration of the combustion will only depend on their thickness. There can thus be formed a charge comprising a number of discs of different thicknesses. On ignition, since the emission surface of the gases is a maximum, the pressure and the torque will also be at their maximum values. At the end of the combustion of each disc, the duration of which will be known, there will take place a drop in pressure and therefore a reduction of the thrust at the nozzles and of the tractive effort on the cable. This method of formation of the charge by discs is only given by way of example. Those skilled in the art can readily determine other combinations giving the same result with one or a number of blocks of powder.

For the application of the invention to parachuted loads, the motor and the winch which it drives are interposed between the parachute and the load, the winch cable having the appropriate length. A form of this application will be described with reference to FIG. 6. The parachute 20 and the parachuted load 21 are joined together according to the invention by the cable 1 hooked on the winch 2, with the motor 8 fixed under the parachute 20. A device of any kind releases the motor 8 at the appropriate time, for example a probe 22 acting by its contact with the ground 23. The motor 8 actuates the winch 2 and brings the load 21 closer with respect to the parachute 20.

A further form of the application of the invention to parachuted loads is shown in FIG. 7. This form only differs from that preceding by the fact that the motor 8 and the winch 2 are attached to the load 21, the cable 1 going directly to the parachute 20.

In both the arrangements shown in FIGS. 6 and 7, the speed of approach of the load and the parachute should vary according to an appropriate law. There is no advantage in fact in permitting this speed to increase beyond a certain value, which is that corresponding to the desired speed of landing. This assumes that when this value is reached, the acceleration becomes zero and the movement continues at constant speed. The resultant F of the thrust on the discharge-nozzles should then be, from that moment, just sufficient to balance the weight of the load. This result is obtained, as previously stated, for example, by forming the charge of powder by a number of discs of different thicknesses. There is therefore available a great flexibility in the determination of the moment and the speed of landing, and this is especially advantageous in view of the wide margin which results for the choice of the height from the ground at which the ignition should be operated.

In order to give those skilled in the art a better understanding of the invention, the following numerical example will be given, with the indication of the constitution of a suitable charge of powder, for the case of a parachuted load weighing one metric ton and fixed to a parachute giving it a speed of descent of 7 metres per second. It is required of the device according to the invention to reduce the speed of the load to 2 m./sec. at the moment of its impact with the ground. A value of 2 metric tons is chosen for the tractive force T on the cable, from which, with a ratio of transmission $R=20$ (readily obtainable by means of the double reduction gear according to FIG.

1), a tangential thrust at the discharge nozzles of 100 kgs. is obtained. In order to take account of the friction and inertia, and to have a margin of safety, F is taken as 150 kg. The pressure of combustion of the powder (for example a powder without solvent, of nitro-glycerine, of current manufacture) is chosen to be equal to 120 kg./sq. cm., which gives a coefficient of compression $K=535$, and a speed of combustion of 9.32 mm./sec.

It has been found that the section at the neck of the whole of the discharge-nozzles is 90 sq. mm. as a suitable value; the emission surface of gas of the charge in combustion is then $90 \times 535 = 481$ sq. cm., or approximately three discs of powder of 10 cm. in diameter. On the other hand, when the motor is started up, the tractive pull on the cable passes abruptly from one metric ton to two metric tons, which causes the speed of descent of the parachute to pass from 7 metres/sec. to $7 \times \sqrt{2}$ metres/sec., or practically 10 metres/sec. The speed of approach of the load with respect to the parachute is therefore at this initial instant 3 m./sec., and it will reach $10-2=8$ m./sec., or an increase of $8-3=5$ m./sec. at the end of about 0.5 sec. During this 0.5 sec., the load has an average speed of $$\frac{7+2}{2} = 4.5 \text{ m./sec.}$$

and will have travelled 2.25 metres. It will therefore be necessary to effect the firing of the motor when the load is at 2.25 metres from the ground. In the same way, the average speed of approach of the load with respect to the parachute being $$\frac{3+8}{2} = 5.50 \text{ m./sec.}$$

the length of cable wound during 0.5 sec. will be 2.75 m. Finally, the speed of combustion of the powder under the conditions indicated being 9.32 mm./sec., the thickness of the discs will be about 10 mm.

The above example brings out clearly other advantages of the invention: simplicity of the means employed, for example a charge formed by three discs of powder with a diameter of 10 cm. in diameter and 1 cm. in thickness, the winch winding only 2.75 m. of cable, operation at only 2.25 m. from the ground.

For the application of the invention to the landing of aircraft, the motor and the winch which it actuates are interposed between the parachute and the aircraft, the winch cable having an appropriate length. One form of this application will be described with reference to FIG. 8. In this figure, the aircraft 24 has just made contact with the ground 23 and has released its parachute 20 to which it is connected by a cable 1 with, according to the invention, a winch 2 and a motor 8 attached to the rear of the aircraft 24; the motor 8 is then started-up, for example by the pilot, and actuates the winch 2, bringing the aircraft close to the parachute 20.

A further form of application of the invention to the landing of aircraft is shown in FIG. 9. This form only differs from that previously described by the fact that the motor 8 and the winch 2 are attached to the parachute 20, the cable going directly to the aircraft 24.

In the two arrangements shown in FIGS. 8 and 9, there is generally an advantage in keeping constant the tractive force T applied to the cable by the motor according to the invention. The parachute being acted on by this constant force remains at constant speed with respect to the air, and there is thus obtained a very short stopping distance—much shorter than that obtained with the same parachute used in a conventional manner.

This arrangement according to the invention has a further advantage: if, for any reason, the aircraft makes contact with the ground at a higher speed than that specified, the motor according to the invention limits the force on the cable to the value specified (the cable unwinds), thus avoiding overload and risk of tearing the parachute.

In order to give those skilled in the art a better understanding of the invention, the following numerical example will be given, with the indication of the constitution of a suitable charge of powder, of the case of an aircraft weighing 5 metric tons, landing at a speed of 60 m./sec. (216 km./hr.) and provided with a parachute of about 25 sq. m., supplying at 60 m./sec. a resistance of 7.2 metric tons. The winch must apply on the cable a force of 7,200 kg., namely, with the same transmission ratio $R=20$ already employed, a tangential thrust at the discharge-nozzles of 360 kg.

With the same powder and the same conditions of combustion as previously considered, it was found that the section at the neck of all the discharge-nozzles was 214 sq. mm. as a suitable value. The emission surface of gas of the combustion charge is then $214 \times 535 = 1,145$ sq. cm., or substantially three discs of powder of 16 mm. in diameter. The duration of combustion (calculated below) being 4.24 sec., these discs will have a thickness of about 8 cm., or a weight of powder (density 1.55) of about 7.5 kg. Since the aircraft is braked by a constant force of 7.2 metric tons for a weight of 5 metric tons, there will thus be a constant retardation of 14.1 m./sec.$^2$, which gives a stopping time from 60 m./sec. of 4.24 sec. and a stopping distance of 127 m. The length of the cable will also be 127 m.

The case dealt with above is a theoretical case: in reality, the effect of the conventional braking devices (wing flaps, disc brakes on wheels), and the resistance of the air, will substantially reduce the work required from the device according to the invention, enabling the charge of powder to be reduced, for example. The charge of powder according to the invention may for example comprise a disc of smaller thickness than the two others, so as to produce a reduction in the force just before the end of the operation, in order that the deceleration may be less over the last few metres before the aircraft stops.

Although the case given above is theoretical, a comparison with that which would have been obtained under the same conditions by means of the conventional parachute will emphasize the advantages of the invention. This comparison will be limited to deceleration down to 10 m./sec., for below this speed the conventional parachute becomes too little effective (and is furthermore no longer employed).

In order to decelerate the aircraft considered from 60 m./sec. to 10 m./sec., the device according to the invention, with a constant deceleration of 14.1 m./sec.$^2$, requires 3.54 sec. and 124 m. The same parachute utilized without the device according to the invention only provides the same deceleration of 14.1 m./sec.$^2$ at the speed of 60 m./sec. For a lower speed, the deceleration diminishes as the square of the speed, so that in order to slow-down to 10 m./sec., there is required in this case 21.33 sec. and 457 m. The gains ensured by the invention are therefore about 78% on the time and 63% on the slowing-down distance. In addition, the device according to the invention permits complete stopping with the parachute only, which would not be possible when used without the device according to the invention, and this within a very short distance.

For the application of the invention to the take-off of aircraft, the motor and the winch which it actuates are interposed between the aircraft and a fixed point on the ground, the cable of the winch having an appropriate length. A form of this application is described with reference to FIG. 11. In this figure, the aircraft 24 which is about to take-off, will be pulled by the cable 1 by means of the winch 2 and the motor 8 attached to the fixed point 25 on the ground. The motor 8 is started, for example by the pilot, and the aircraft takes-off; at the end of the take-off operation, the aircraft releases the cable 1 by the conventional hook 26.

A further form of the application of the invention to the take-off of aircraft is shown in FIG. 10. This form only differs from that previously described by the fact that the winch 2 and the motor 8 are attached to the aircraft 24, the cable going directly to the fixed point 25. The conventional hook 26 may be mounted on the aircraft 24 or on the fixed point 25, depending on questions of choice or opportunity.

In the two forms of application of the invention to the take-off of aircraft, there should be noted the extreme simplicity of the installations on the ground, which are reduced to a fixed point; furthermore, there is no need for any ground staff. The invention thus permits aircraft to take-off from a makeshift landing ground, for example after a forced landing.

Although the invention has been described with reference to preferred arrangements, it is clear that modifications may be made without thereby departing from the scope of the invention, as will be evident to any person skilled in the art.

What I claim is:

1. A cable winding system comprising a combustion chamber for holding a charge of combustible powder for combustion therein, a plurality of substantially tangentially directed discharge nozzles communicating with said combustion chamber for discharging the combustion gases generated by combustion of the powder, means supporting said nozzles for rotation so that said nozzles rotate when combustion gases flow therethrough, a speed reducing transmission connected to said nozzles for being driven thereby when said nozzles rotate, a winch connected to said transmission for being driven thereby, a cable connected to said winch for winding thereon, said cable being connected to a load and the remainder of the system being attached to a parachute.

2. A cable winding system comprising a combustion chamber for holding a charge of combustible powder for combustion therein, a plurality of substantially tangentially directed discharge nozzles communicating with said combustion chamber for discharging the combustion gases generated by combustion of the powder, means supporting said nozzles for rotation so that said nozzles rotate when combustion gases flow therethrough, a speed reducing transmission connected to said nozzles for being driven thereby when said nozzles rotate, a winch connected to said transmission for being driven thereby, a cable connected to said winch for winding thereon, the cable being connected to a parachute and the remainder of the system being attached to a load.

3. A cable winding system comprising a combustion chamber for holding a charge of combustible powder for combustion therein, a plurality of substantially tangentially directed discharge nozzles communicating with said combustion chamber for discharging the combustion gases generated by combustion of the powder, means supporting said nozzles for rotation so that said nozzles rotate when combustion gases flow therethrough, a speed reducing transmission connected to said nozzles for being driven thereby when said nozzles rotate, a winch connected to said transmission for being driven thereby, a cable connected to said winch for winding thereon, the cable being connected to a parachute and the remainder of the system being attached to an aircraft.

4. A cable winding system comprising a combustion chamber for holding a charge of combustible powder for combustion therein, a plurality of substantially tangentially directed discharge nozzles communicating with said combustion chamber for discharging the combustion gases generated by combustion of the powder, means supporting said nozzles for rotation so that said nozzles rotate when combustion gases flow therethrough, a speed reducing transmission connected to said nozzles for being driven thereby when said nozzles rotate, a winch connected to said transmission for being driven thereby, a cable connected to said winch for winding thereon, the cable being connected to an aircraft and the remainder of the system being attached to a parachute.

5. A cable winding system comprising a combustion chamber for holding a charge of combustible powder for combustion therein, a plurality of substantially tangentially directed discharge nozzles communicating with said combustion chamber for discharging the combustion gases generated by combustion of the powder, means supporting said nozzles for rotation so that said nozzles rotate when combustion gases flow therethrough, a speed reducing transmission connected to said nozzles for being driven thereby when said nozzles rotate, a winch connected to said transmission for being driven thereby, a cable connected to said winch for winding thereon, the cable being releasably connected to an aircraft and the remainder of the system being secured to a fixed point.

6. A cable winding system comprising a combustion chamber for holding a charge of combustible powder for combustion therein, a plurality of substantially tangentially directed discharge nozzles communicating with said combustion chamber for discharging the combustion gases generated by combustion of the powder, means supporting said nozzles for rotation so that said nozzles rotate when combustion gases flow therethrough, a speed reducing transmission connected to said nozzles for being driven thereby when said nozzles rotate, a winch connected to said transmission for being driven thereby, a cable connected to said winch for winding thereon, the cable being connected to a fixed point and the remainder of the system being attached to an aircraft.

References Cited in the file of this patent

UNITED STATES PATENTS

| 927,200 | Wick | July 6, 1909 |
| 2,477,907 | Smith | Aug. 2, 1949 |
| 2,756,950 | Greenough | July 31, 1956 |
| 3,036,795 | Sinclair | May 29, 1962 |

FOREIGN PATENTS

| 1,053,318 | France | Sept. 30, 1953 |
| 1,093,417 | France | Feb. 19, 1954 |